(12) United States Patent
Jazbinsek (10) Patent No.: US 12,432,308 B2
(45) Date of Patent: Sep. 30, 2025

(54) METHOD AND SYSTEM FOR PROCESSING VIDEO DATA

(71) Applicant: Sumolight GmbH, Berlin (DE)

(72) Inventor: Sascha Jazbinsek, Berlin (DE)

(73) Assignee: SUMOLIGHT GMBH, Berlin (DE)

( * ) Notice: Subject to any disclaimer, the term of this patent is extended or adjusted under 35 U.S.C. 154(b) by 0 days.

(21) Appl. No.: 17/984,346

(22) Filed: Nov. 10, 2022

(65) Prior Publication Data

US 2023/0164285 A1    May 25, 2023

(30) Foreign Application Priority Data

Nov. 12, 2021 (DE) .......................... 102021129573.4

(51) Int. Cl.
   *H04N 5/222*   (2006.01)
   *H04N 5/272*   (2006.01)
   *H04N 9/31*    (2006.01)

(52) U.S. Cl.
   CPC ......... *H04N 5/2228* (2013.01); *H04N 5/2226* (2013.01); *H04N 5/272* (2013.01); *H04N 9/3138* (2013.01)

(58) Field of Classification Search
   CPC .... H04N 5/2228; H04N 5/2226; H04N 5/272; H04N 9/3138; H04N 5/2224
   See application file for complete search history.

(56) References Cited

U.S. PATENT DOCUMENTS

| | | | |
|---|---|---|---|
| 6,611,241 B1 * | 8/2003 | Firester | H04N 9/12 345/1.3 |
| 7,621,641 B1 * | 11/2009 | Silverstein | G03B 33/12 359/638 |
| 2005/0195365 A1 | 9/2005 | Lamarre | |

(Continued)

FOREIGN PATENT DOCUMENTS

CN           104392468 A        3/2015

OTHER PUBLICATIONS

Von Voss Olaf: "SUMOSKY—Expandable LED Wall for Easy VFX Studio Work", May 13, 2021 (May 13, 2021); URL: https://www.cined.com/sumosky-expandable-led-wall-for-easy-vfx-studio-work/#comment-box.

(Continued)

*Primary Examiner* — Michael Lee
(74) *Attorney, Agent, or Firm* — Schmeiser, Olsen & Watts LLP (57) ABSTRACT

A method for processing video data by a system, including a recording device configured to generate video data; a projection screen having a front side facing the recording device and a rear side facing away from the recording device, and a plurality of light sources is provided. The method includes: providing background data which indicate a video background with a first resolution, and determining image signals from the background data in such a way that the image signals indicate the video background with a second resolution that is lower than the first resolution;

(Continued)

transmitting the image signals to the light sources and irradiating the rear side by the light sources; and recording first video data by the recording device, wherein the first video data indicate a video of the front side and of a foreground object arranged between the projection screen and the recording device. A system is also provided.

13 Claims, 7 Drawing Sheets

(56) References Cited

U.S. PATENT DOCUMENTS

| | | | |
|---|---|---|---|
| 2008/0084508 A1* | 4/2008 | Cole | H04N 5/275 |
| | | | 348/744 |
| 2010/0046837 A1 | 2/2010 | Boughorbel | |
| 2012/0170832 A1 | 7/2012 | Liu et al. | |
| 2017/0255022 A1* | 9/2017 | Duffy | G03B 21/62 |
| 2020/0267334 A1* | 8/2020 | Cyrus | H04N 5/2226 |
| 2022/0201163 A1* | 6/2022 | Ukas-Bradley | H04N 5/272 |
| 2023/0110184 A1* | 4/2023 | Popp | H04N 5/2224 |
| | | | 348/744 |

OTHER PUBLICATIONS

Anonymous: "SUMOSKY Is the Massive LED Backdrop Your Virtual Production Needs", Feb. 11, 2021; URL: https://nofilmschool.com/sumosky-massive-led-backdrop-every-virtual-production-needs.

Hans-Gunther Nusseck: "Modulare Ruckprojection als aktiver Bildhintergrund in TV-Studios", FKT Fernseh Und Kinotechnik, Fachverlag Schiele & Schon GMBH., Berlin, DE, Bd. 67, Nr. 6, Jun. 1, 2013 (Jun. 1, 2013), Seiten 325-328, XP001584489, ISSN: 1430-9947.

* cited by examiner

METHOD AND SYSTEM FOR PROCESSING VIDEO DATA

CROSS-REFERENCE TO RELATED APPLICATIONS

This application claims priority to German Application No. 102021129573.4, having a filing date of Nov. 12, 2021, the entire contents of which are hereby incorporated by reference.

FIELD OF TECHNOLOGY

The following relates to a method and a system for processing video data.

BACKGROUND

When filming in a studio, the visible video background must be either physically recreated or virtually adjusted so as to allow actors or other foreground objects to be later inserted into a virtual surroundings during post-production. Physically recreating scenes in the studio is generally expensive, time-consuming, and severely limits the acting of the actors and the film crew's freedom of movement. In addition, spontaneous changes to the design of the set and to the movement sequences in the scenes may be implemented only with difficulty.

In order to minimize the aforementioned limitations, a plurality of known methods have been established. In the case of a green screen method or blue screen method, the studio is lined with green or blue special fabric. If scenes are shot in front of corresponding monochrome surfaces, actors may then be cut out or cropped and inserted into other separately created scenes. Alternatively, the actors may be filmed in front of rear projection screens while background sequences are projected from behind in high resolution onto the rear projection screens. The high-resolution background sequences may, alternatively, be played back on high-resolution LCD monitors which transition seamlessly into one another (virtual production). However, productions with high-resolution playback of the background sequences incur high costs, especially when it comes to procurement and installation.

SUMMARY

An aspect relates to a method and a system with which video data may be generated in a simplified and cost-effective manner.

According to one aspect, a method is provided for processing video data by a system, comprising: a recording device configured to generate video data; a projection screen having a front side facing the recording device and a rear side facing away from the recording device, and a plurality of light sources; the method comprising: providing background data which indicate a video background with a first resolution, and determining image signals from the background data such that the image signals indicate the video background with a second resolution lower than the first resolution; transmitting the image signals to the light sources and irradiating the rear side of the projection screen by the light sources; and recording first video data by the recording device, wherein the first video data indicate a video of the front side of the projection screen and of a foreground object arranged between the projection screen and the recording device.

According to a further aspect, a system is provided for processing video data, comprising the following: a recording device configured to generate video data; a projection screen having a front side facing the recording device and a rear side facing away from the recording device, and a plurality of light sources, the system being configured to carry out the method for processing video data.

With embodiments of the method and the system, specific light situations which result from the surroundings of the scenes may be generated in a favorable manner during the shoot. In particular, light reflections on the foreground objects do not have to be produced separately in a costly manner during post-production. At the same time, visual feedback may be provided in low-resolution during the shoot by the video background. In particular, background motifs such as the sky or horizons may be simulated at different times of the day. In contrast to the use of high-priced LCD monitors, increased scalability and easier interchangeability of light sources may be provided. Banding or moiré effects, as well as operating noises near the recording device, which may occur when using LCD monitors, may be avoided when using the projection screen and the light sources. Furthermore, a rapid setup of the system may be made possible.

In embodiments, the method may further comprise: determining, by a data processing apparatus, second video data from the first video data by cropping a first image region of the video assigned to the foreground object from a second image region of the video assigned to the front side of the projection screen. The second image region may also be assigned to a complement of the first image region.

The cropping may comprise masking of the first image region and/or second image region.

The first image region may indicate a projection of the foreground object with respect to the recording device. The second image region may indicate a projection of the video background with respect to the recording device.

The background data may be provided in the data processing apparatus. The background data may be generated by photogrammetric detection of background motifs and/or background surroundings. For example, 3D models (3D assets) of the background motifs and/or the background surroundings may be generated and/or provided. The video background may contain CGI (computer generated imagery) content. Due to the reduced second resolution and a correspondingly reduced level of detail, the cropping may be simplified.

The data processing apparatus may have one or more processors and one or more data memories. The data processing apparatus may be provided outside the system. Alternatively, the system may have the data processing apparatus.

In embodiments, the method may further comprise: Determining depth information which indicates a distance between the recording device and the foreground object, and determining the first image region by the depth information. In particular, the depth information may be assigned to the first image region.

The first image region may comprise image portions of a plurality of video frames of the video. Likewise, the second image region may also comprise image portions of a plurality of video frames of the video.

The depth information may be determined, for example, by detecting spatial coordinates of the recording device and/or of the foreground object. For this purpose, sensors may be provided on the recording device and/or on the foreground object. Other spatial coordinates of the projection screen may also be detected.

Additionally or alternatively, the first image region may be determined by a machine learning algorithm, in particular by an artificial neural network.

In embodiments, the method may additionally or alternatively comprise: determining movement information which indicates a relative movement of the foreground object and determining the first image region (in addition) by the movement information. In particular, a relative movement of the foreground object may correspond to a further relative movement of the first image region within a sequence of video frames of the video.

The movement information may also comprise further movement information of the recording device. The movement information may be detected, for example, by additional sensors on the foreground object and/or on the recording device. The movement information may also be determined from a plurality of the video frames of the first video data.

The recording device may be a camera.

In embodiments, the method may further comprise: determining, by the data processing apparatus, third video data from the second video data by combining the first image region with the video background.

In particular, the second image region may be replaced by the video background. The second video data may indicate the foreground object that has been cropped. The first image region may be combined with the video background by putting the first image region in front of the video background. The combining may be carried out for a plurality of the video frames.

In embodiments, the method may also comprise arranging the light sources in a plane parallel to the projection screen.

In particular, the projection screen may be arranged within a (further) plane, for example in a vertical plane, a horizontal plane or a diagonal plane. Alternatively, the projection screen may be provided in curved form. The projection screen may comprise a plurality of sub-screens which are each arranged in different planes. The projection screen may be in one piece or in a plurality of pieces. Alternatively, the light sources may also be arranged in a plane which is inclined or orthogonal with respect to the projection screen.

The projection screen may be a rear projection screen. The projection screen may be made of PVC, for example. The projection screen may be formed as at least partially translucent. The foreground object may be part or, alternatively, not part of the system. For example, the foreground object may be an object of the set or an actor.

Arranging the light sources may comprise arranging the light sources equidistantly with respect to a first plane direction at a first distance and equidistantly with respect to a second plane direction at a second distance.

The first plane direction and the second plane direction may be (substantially) orthogonal to one another. The first plane direction and the second plane direction may also be arranged at an angle of between 75° and 85° to one another, for example. In particular, the light sources may be provided in a lattice arrangement or grid arrangement. The first distance may be a horizontal distance and the second distance may be a vertical distance. In embodiments, the first distance may be between 4 cm and 100 cm, for example, between 5 cm and 20 cm. In embodiments, the second distance may be between 2 cm and 100 cm, for example, between 3 cm and 50 cm or between 20 cm and 40 cm.

The light sources may be arranged in such a way that a homogeneous illumination is produced on the projection screen.

Further light sources may be provided, wherein the projection screen is not arranged between the recording device and the further light sources. The further light sources may be configured to illuminate the foreground object and/or the front side of the projection screen.

Arranging the light sources may further comprise adjusting a third distance between the plane and the projection screen. By reducing the third distance, the light output on the projection screen may be increased, for example.

In embodiments, the third distance may be between 10 cm and 200 cm, for example, between 20 cm and 50 cm.

The method may furthermore comprise arranging the light sources in groups in a plurality of carriers, which in embodiments may each have a horizontally arranged group of light sources.

The carriers may be made of aluminum. The carriers may have a beam shape. The carriers may be aligned horizontally, vertically or diagonally. The group of light sources may be arranged along a line, in particular along a straight line. The group of light sources may also be arranged along a curved shape.

Each of the light sources may be controlled individually, for example by a control device or by the data processing apparatus. By the carrier, the number of individual devices required, and thus the assembly effort, may be reduced. Furthermore, alignment of each individual light source may be avoided. At the same time, homogeneous illumination may be made possible.

In embodiments, the carriers may each have a length of between 100 cm and 300 cm, for example, between 150 cm and 250 cm. In embodiments, the carriers may each have a width of between 2 cm and 10 cm, for example, between 3 cm and 5 cm. In embodiments, the carriers may each have a depth of between 2 cm and 10 cm, for example, between 3 cm and 5 cm.

Arranging the light sources may comprise connecting the plurality of carriers using connecting means in such a way that the plurality of carriers are arranged equidistantly from one another.

The plurality of carriers may be connected to the connecting means by quick connectors. The quick connectors may be formed, for example, as click connectors and/or latching connectors. In this way, carriers may be flexibly attached or removed, depending on the lighting situation.

In embodiments, the method may furthermore comprise providing the light sources (and/or the additional light sources) with a red light-emitting diode (LED), a green light-emitting diode, a blue light-emitting diode, a warm-white light-emitting diode and a cold-white light-emitting diode. In particular, each of the light sources (and/or the additional light sources) may be in the form of an RGBWW LED. Increased illuminance may be achieved by RGBWW LEDs.

In embodiments, the warm white light-emitting diode may have a color temperature between 2600 and 3300 K, or between 2700 K and 2900 K, for example. In embodiments, the cold-white light-emitting diode may have a color temperature between 5300 K and 5900 K, or between 5600 K and 5800 K, for example.

In addition, the light sources (and/or the additional light sources) may form a plurality of first light sources as RGBWW LEDs and a plurality of second light sources may each have a warm-white light-emitting diode and/or a cold-white light-emitting diode. Each of the light sources may be between 5 mm×5 mm and 10 mm×10 mm wide and/or long.

The image signals may comprise a plurality of pixels, each of which is assigned to one of the light sources. Each pixel may have between one and five color values, in particular one for red, green, blue, warm white and cool white. Each pixel may be transmitted to the corresponding light source.

Determining the image signals may comprise: Assigning at least one, in embodiments a plurality, of the pixels to a background position in the video background and determining the at least one pixel, in embodiments the plurality of pixels, by weighted averaging of color information of the video background depending on the distance of the color information from the background position. The image signals may be determined in the data processing apparatus, the control device or a further data processing apparatus.

In particular, image information of the video background with a greater distance from the background position of the pixel may be given a lower weighting.

The pixels may be assigned to a background position depending on the first distance and/or second distance and/or third distance.

Furthermore, determining the image signals may comprise dividing the video background into a plurality of sub-regions, each of which is assigned to one of the pixels, and determining at least one, in embodiments a plurality, of the pixels from color information from one of the sub-regions in each case. Each sub-region may be arranged around a corresponding background position of the corresponding pixel in the video background.

The sub-regions may overlap with one another, adjoin one another and/or be spaced apart from one another. In particular, the sub-regions may cover the video background without gaps and without overlapping. The sub-regions may each be assigned to one of the light sources. Each pixel may be determined, for example, by interpolating and/or averaging the image information of the corresponding sub-region.

It is possible for (external) color information outside of one of the sub-regions to be given a weight of zero for determining the assigned pixel. It is also possible for (internal) color information within the sub-region to be given the same weight for determining the assigned pixel.

In relation to the background data of the video background, the image signals may have a resolution scaling factor of between 1:5 and 1:100, for example, between 1:8 and 1:12, or, for example, of 1:10. In embodiments, one pixel may thus correspond to ten video background points.

The embodiments described above in connection with the method for processing video data may be provided accordingly in connection with the system for processing video data.

BRIEF DESCRIPTION

Some of the embodiments will be described in detail, with references to the following Figures, wherein like designations denote like members, wherein.

DETAILED DESCRIPTION

Figure 1:
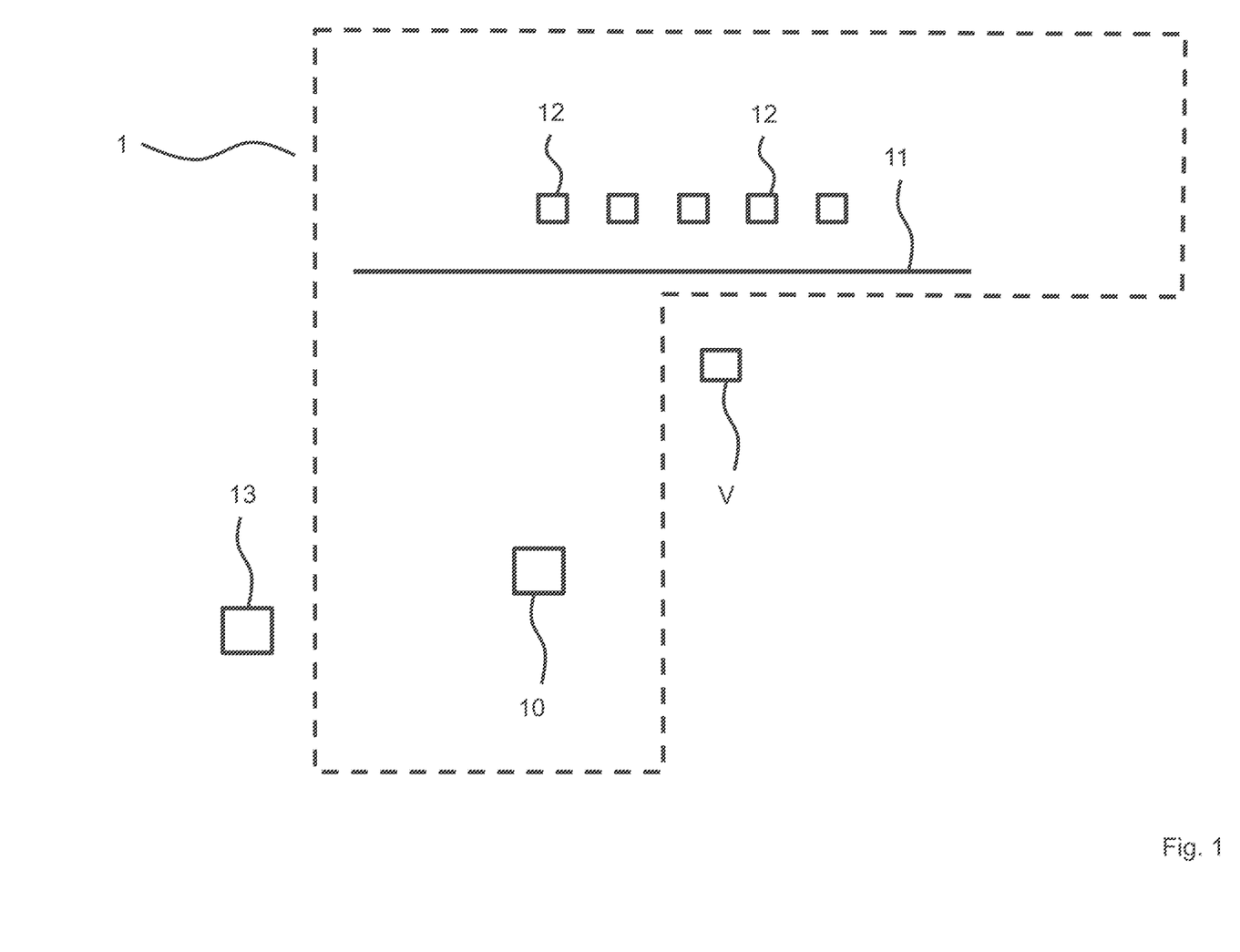
FIG. 1 is a schematic representation of a system for processing video data.

FIG. 1 is a schematic representation of a system for processing video data. The system has a recording device 10 which is configured to generate video data, a projection screen 11 having a front side facing the recording device 10 and a rear side facing away from the recording device, and a plurality of light sources 12. Furthermore, a data processing apparatus 13 may be provided. The rear side of the projection screen 11 is illuminated by the light sources 12. First video data are recorded by the recording device 10. The first video data indicate a video of the front side of the projection screen 11 and of a foreground object V which is arranged between the projection screen 11 and the recording device 10. For example, the foreground object V may be an object of the set or an actor. The light sources 12 may be controlled by the data processing apparatus 13 or by a control device (not shown).

Figure 2:
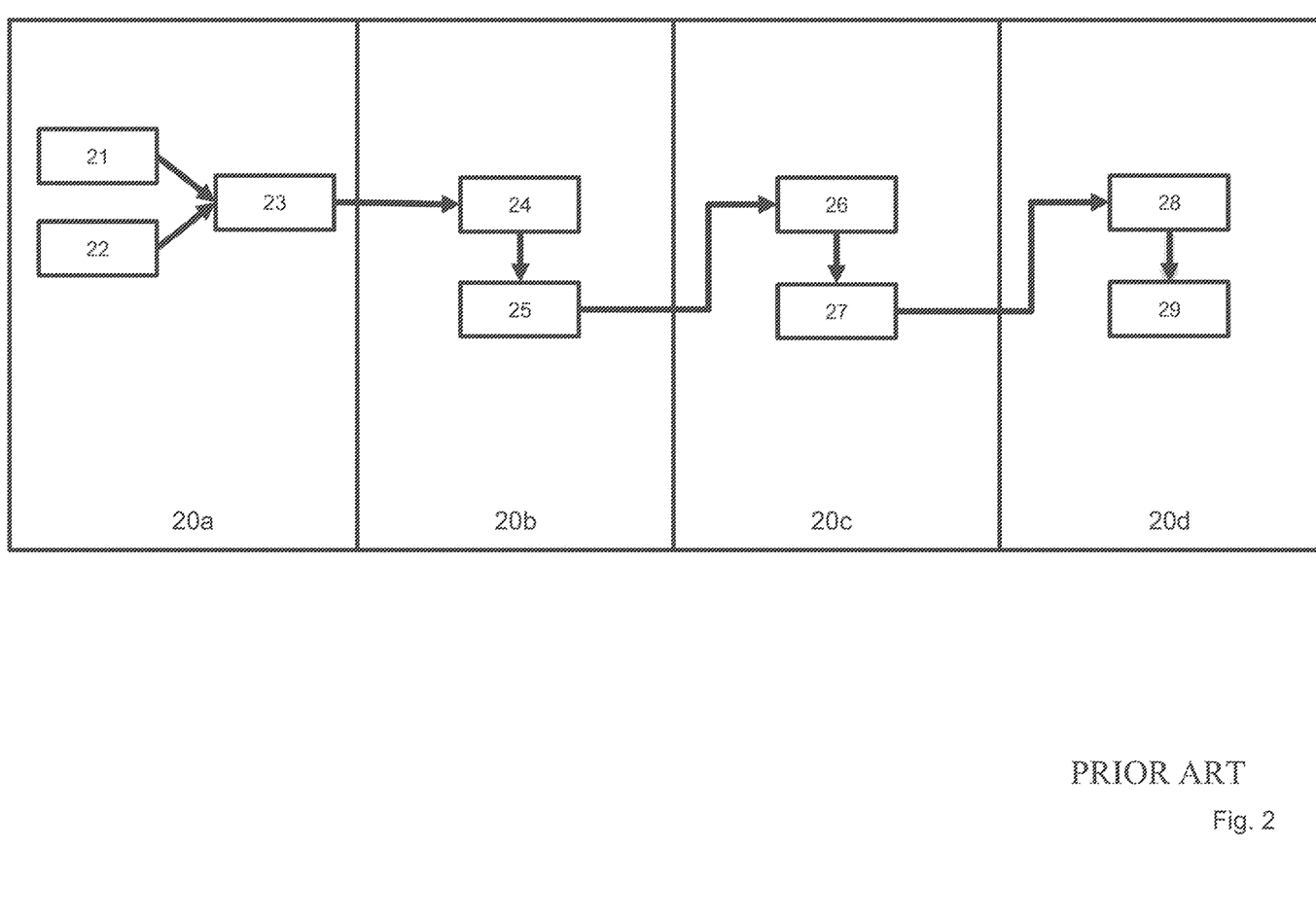
FIG. 2 is a schematic representation of a virtual production method for processing video data according to the conventional art.

FIG. 2 is a schematic representation of a virtual production method for processing video data according to the conventional art. In embodiments, the method is divided into four phases: pre-production 20a, shooting 20b, post-production 20c and release phase 20d. In pre-production 20a, a photogrammetric detection 21 of background motifs and/or background surroundings is executed by 3D models. Furthermore, CGI content is provided 22. The 3D models and CGI content are then merged, 23, and background data of a high-resolution video background is generated.

The shooting 20b comprises a provision 24 of high-resolution LED screens in front of which the foreground objects V are placed. A film recording 25 of the foreground objects V by the recording device 10 takes place in front of the high-resolution LED screens. Light reflections of virtual surroundings generated by the LED screens on the foreground objects V are visible to a limited extent. Lighting effects and reflections from the desired motif have to be partially imitated using lighting technology. At the same time, movement data of the recording device 10 are detected.

In post-production 20c, the film recordings 25 of the foreground objects V together with the background are integrated 26 with the movement data by the LED screens in order to process resulting video data with high resolution. In the subsequent release phase 20d, a color grading 28 takes place, which includes color corrections, in order to obtain finished film material in a last step 29.

Figure 3:
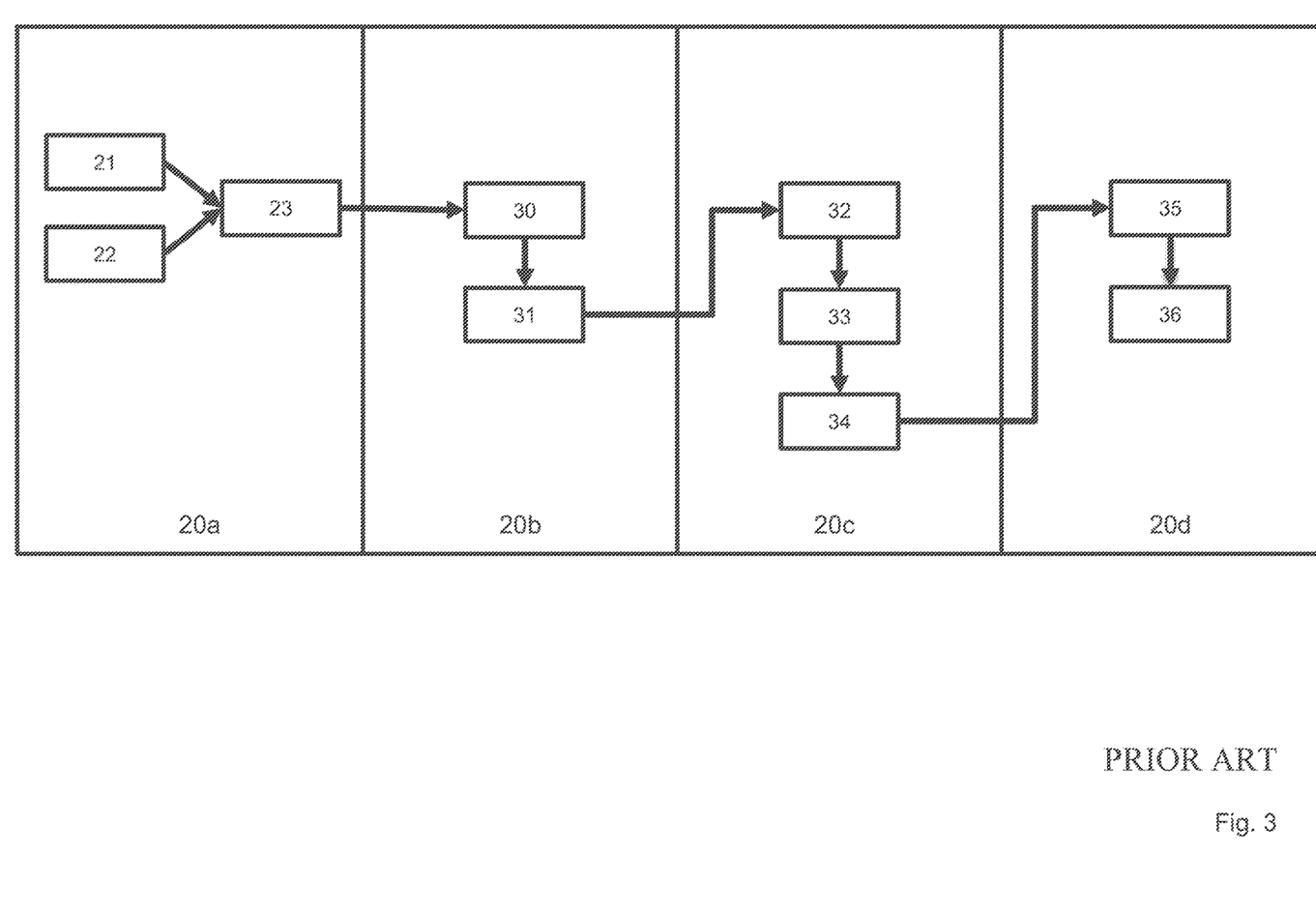
FIG. 3 is a schematic representation of a green screen method for processing video data according to the conventional art.

FIG. 3 is a schematic representation of a green screen method for processing video data according to the conventional art. Steps 21, 22, 23 of the pre-production 20a generally correspond to those of the virtual production method. In the shooting 20b, a green screen is provided 30, in front of which the foreground objects V are placed. A film recording 31 of the foreground objects V by the recording device 10 takes place in front of the green screen. Light effects and reflections from the desired motif have to be almost completely imitated using conventional lighting technology. A cropping 32 of the foreground objects V from image regions that are assigned to the green screen then takes place. Furthermore, a removal 33 of green reflections (from green screen light) on the foreground objects V takes place. Desired light effects and light reflections are applied virtually to the foreground objects that have been cropped, 34. The foreground objects V are then combined 35 with the background data of the high-resolution video background in order to obtain the finished film material in the last step 36.

Figure 4:
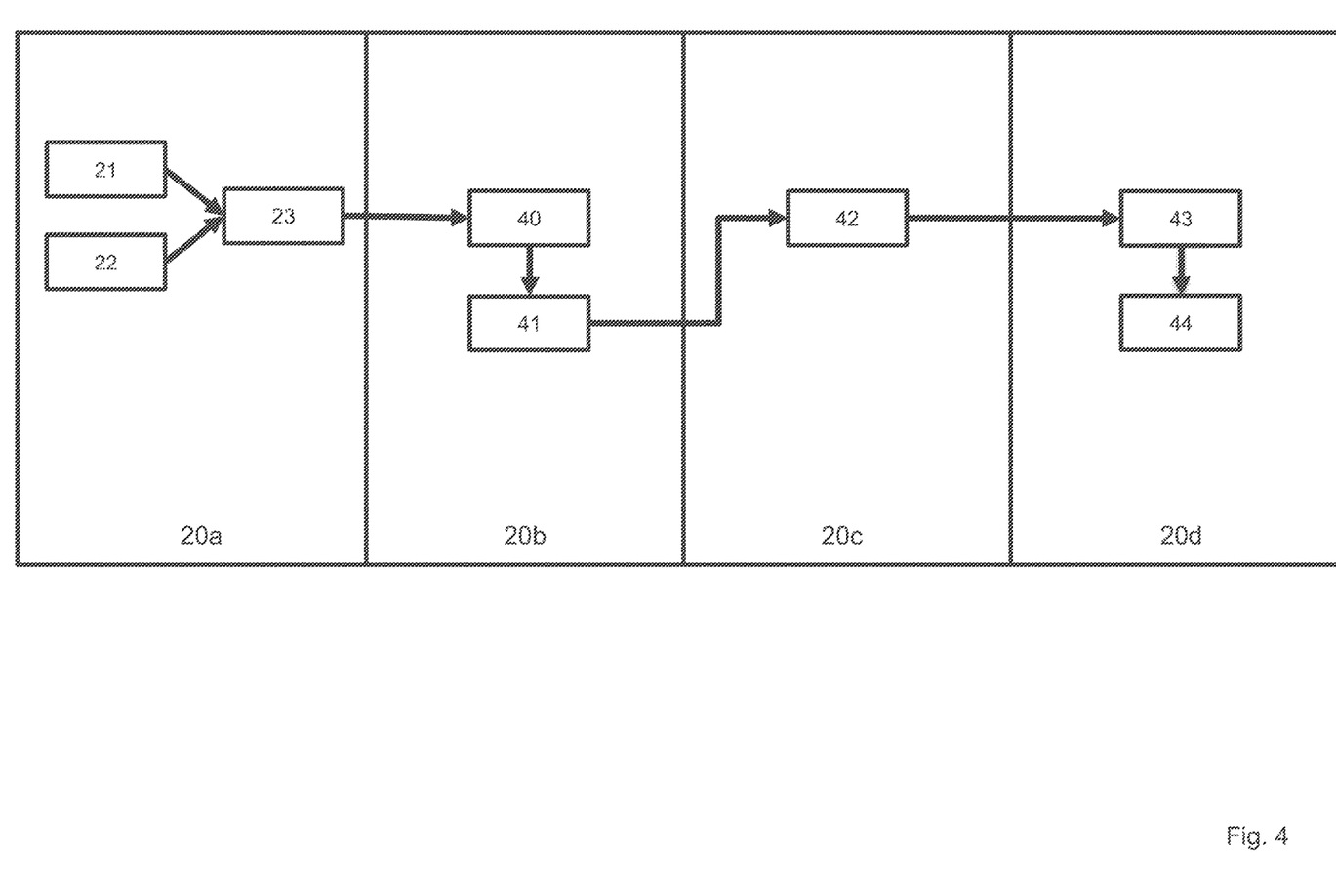
FIG. 4 is a schematic representation of a method for processing video data.

FIG. 4 is a schematic representation of a method for processing video data. In pre-production 20a, the photogrammetric detection 21 of the background motifs and/or the background surroundings by 3D models takes place analogously to known methods. Furthermore, the provision 22 of CGI content and the merging 23 of the 3D models and CGI content together with the generation of the background data of the video background takes place with a (high) first resolution.

In step 40, the recording device 10, the projection screen 11 and the plurality of light sources 12 are provided. Furthermore, image signals are determined from the background data such that the image signals indicate the video background with a second resolution that is lower than the first resolution. In particular, the image signals comprise pixels that are each assigned to one of the light sources 12. In order to determine the pixels, a background position in the video background may be assigned, for example, to each of the pixels. The pixels are then determined by weighted averaging of color information of the video background depending on the distance of the color information from the background position. The pixel color information obtained in this way is transmitted to the corresponding light sources 12 so that the light sources 12 irradiate the rear side of the projection screen 11. The projection screen 11 is at least partially translucent and shows light scattered on the front side.

In this way, in step 41 first video data are recorded by a video of the foreground objects V in front of the projection screen 11 together with the video background in the lower second resolution. In particular, light reflections of the virtual surroundings on the foreground objects V are already visible in sufficient detail. At the same time, movement information (tracking information) of the recording device 10 and/or of the foreground objects V as well as depth information, which indicates a distance between the recording device 10 and the foreground object V, is detected by sensors.

In the following step 42, second video data are determined from the first video data, for example by the data processing apparatus 13, by cropping the first image regions of the video assigned to the foreground object V from second image regions of the video, which are assigned to the front side of the projection screen 11. The first image regions and/or the second image regions may be determined, for example, by the depth information and/or by the movement information. The light reflections of the virtual surroundings are already contained in the second video data and do not have to be generated separately during post-production.

In step 43, third video data is generated from the second video data by combining the cropped first image regions with the video background in the high first resolution in order to obtain the finished film material in the last step 44.

Figure 5:
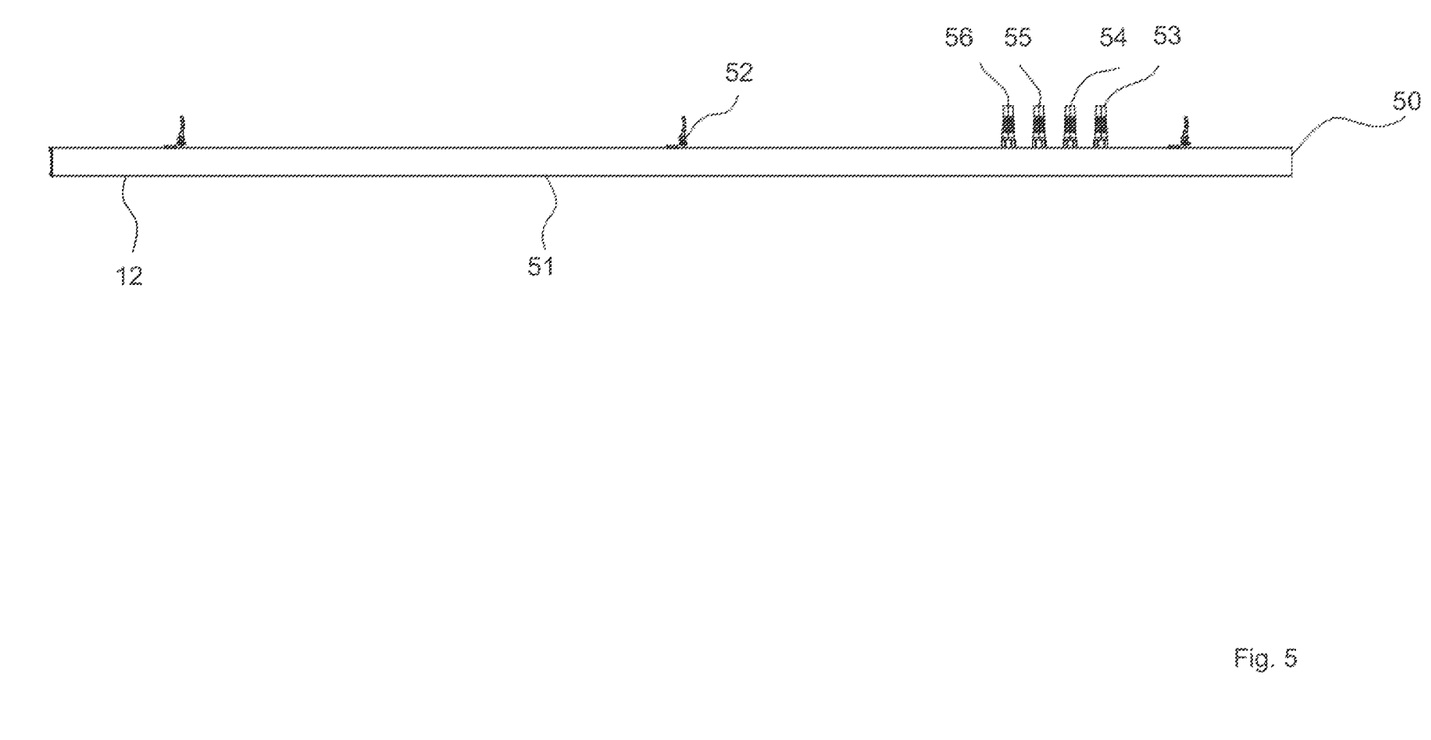
FIG. 5 is a schematic representation of a carrier.

FIG. 5 is a schematic representation of a carrier (light bar) 50 in a plan view. On a light emission side 51, the carrier 50 may have a group of light sources 12 spaced apart from one another, for example at a first distance of 5 cm. The light sources 12 of the group may be horizontally aligned with one another (in a line). Each of the light sources 12 has a red, a green, a blue, a warm white and a cold white LED. Each of the light sources thus represents an RGBWW LED. Conventional RGB LEDs only have narrow wavelength bands for red, green and blue. In contrast, a broadened spectrum is provided for the warm-white LED and the cold-white LED, for example by coating with fluorescent phosphorous.

A plurality of carriers 50 may be arranged vertically one above the other, for example in each case at a second distance from one another of 30 cm.

Due to the use of RGBWW LEDs and the possibility of controlling them individually in groups, not only monochrome backgrounds but also fine color gradients may be realized. This offers the possibility of simulating and flexibly adjusting sky and horizon situations.

The carrier 50 is made of aluminum and has mechanical fastening connections 52, a power input connection 53 (for 110 V to 230 V AC), a power transmission connection 54, a data input connection 55 and a data transmission connection 56. The carrier may have a length of 200 cm, for example. Each of the light sources 12 may be controlled individually and with five channels (one each for red, green, blue, warm white and cold white) via the data input connection 55.

Figure 6A:
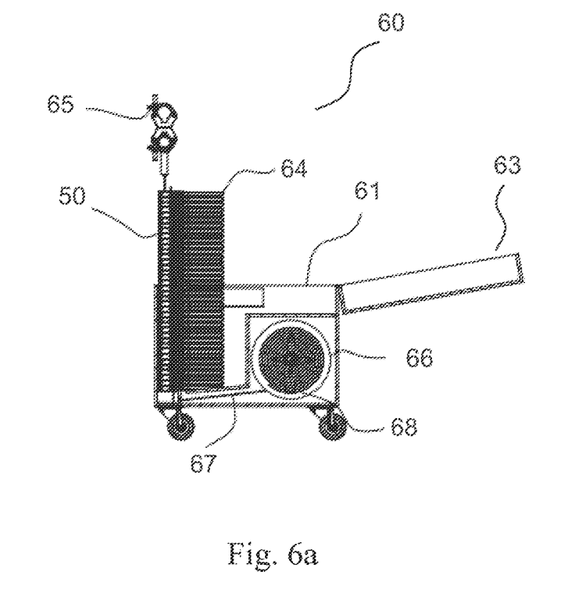
FIG. 6a is a schematic representation of a setup device in a side view.
Figure 6B:
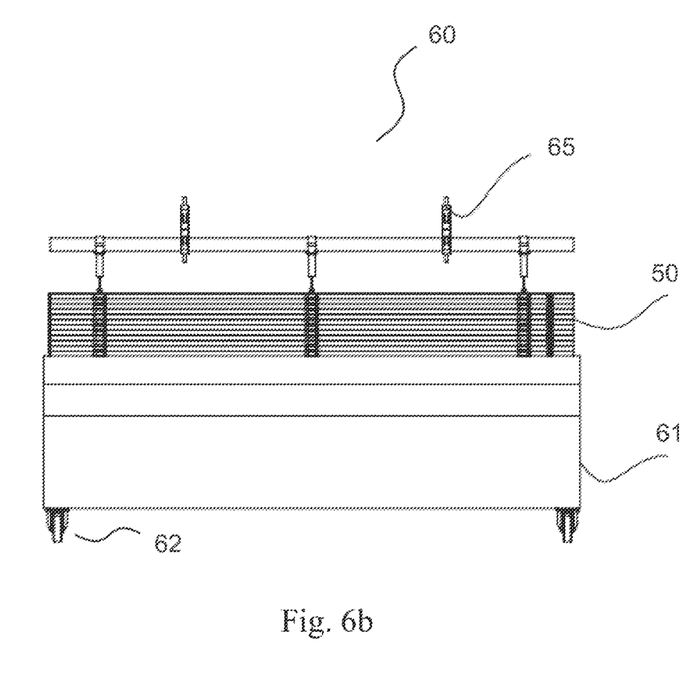
FIG. 6b is a schematic representation of the setup device in a rear view.

FIG. 6a is a schematic representation of a setup device 60 in a side view, and FIG. 6b is a schematic representation of the setup device 60 in a rear view. The setup device 60 may have a storage device 61, for example a flight case. The plurality of carriers 50 may be arranged in the storage device 61 prior to setup. The storage device 61 can allow the carriers 50 and the light sources 12 to be protected against mechanical damage. The storage device 61 may have rollers 62, so that the storage device 61 may be moved without tools. The storage device 61 may have a form factor that is configured for logistically typical dimensions. The storage device 61 may be configured to be stackably arranged. The storage device 61 may have a hinged lid 63. The carriers may be connected to one another by a connecting means 64, such as a strap or woven fabric band. A lifting means 65 may be provided that is configured to set up the plurality of carriers with a motorized cross member system. The setup device may also have a coil 66 (such as a wire cable coil) having a guide means 67, such as a wire cable, and a drive spring 68.

Figure 7A:
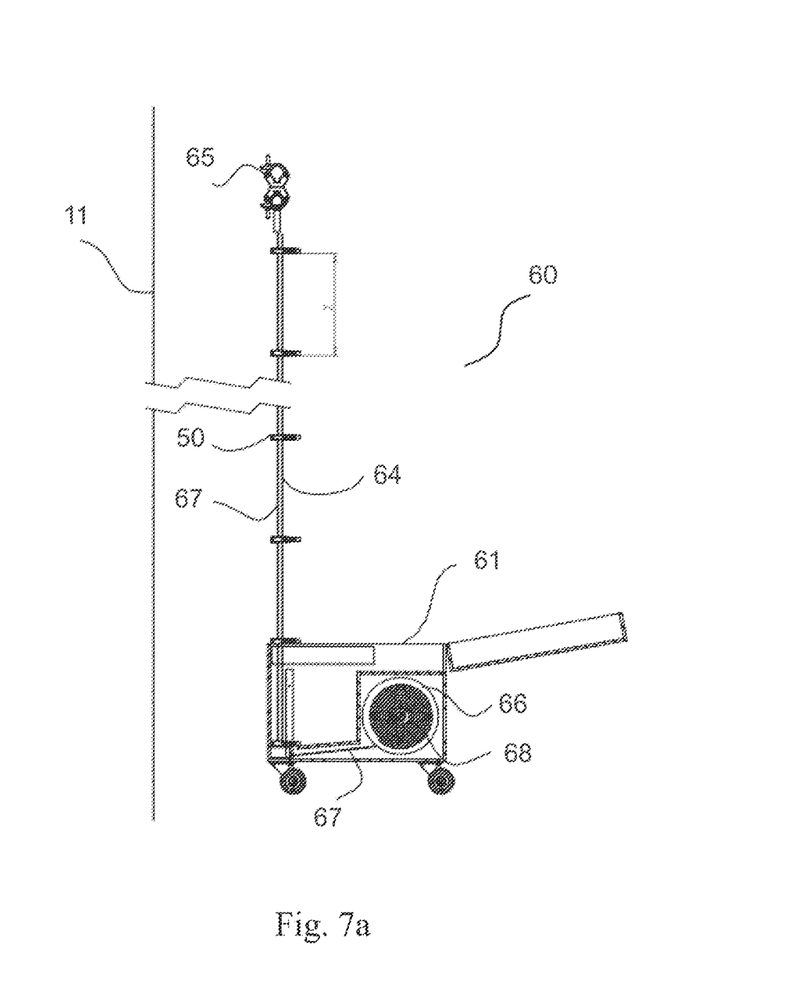
FIG. 7a is a further schematic representation of the setup device in a side view.
Figure 7B:
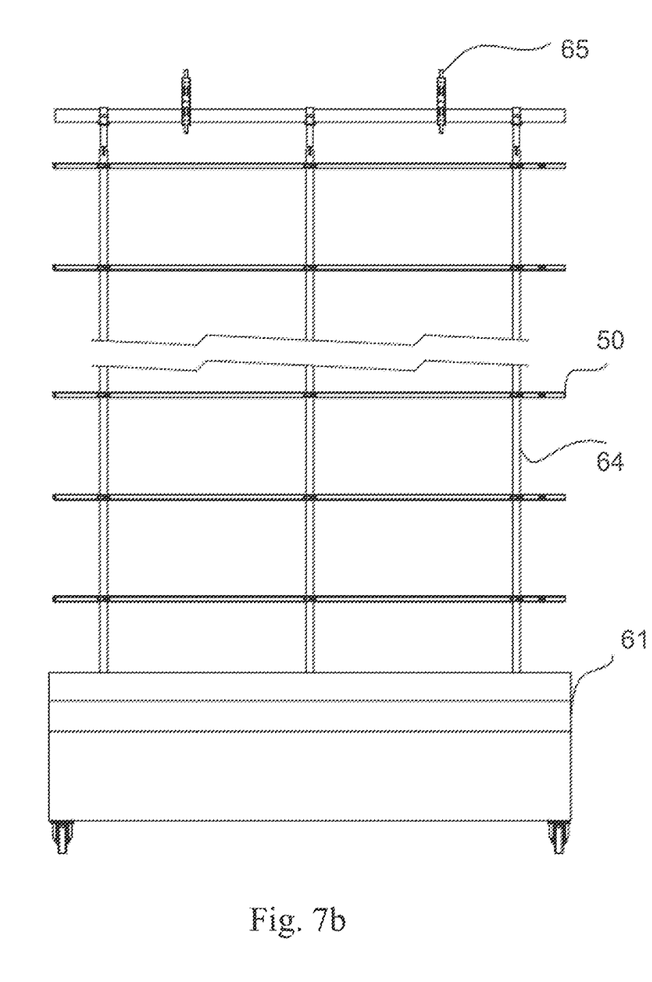
FIG. 7b is a further schematic representation of the setup device in a rear view.

FIG. 7a is a further schematic representation of the setup device 60 in a side view, and FIG. 7b is a further schematic representation of the setup device 60 in a rear view.

After opening the storage device 61, a secure connection to the motorized cross member system is established by the lifting means 64. When the cross-member system is pulled up, the guide means 67 is unwound from the spool 66 and kept under constant tension by the drive spring 68. The guide means 67 is connected to the carriers 50 in such a way that they may remain arranged in one plane. The carriers 50 may be firmly connected to one another by the connecting means 64, for example at the fastening connections 52. The carriers 50 may be easily detachable and reattachable as needed. The carriers 50 are held at the second distance from one another by the connecting means 64. In this way, a homogeneous illumination may be ensured. If required, the light output may be increased by reducing the second distance and a third distance between the projection screen 11 and the carriers 50. The required amount of work may be limited by the setup device 61.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for processing video data by a system comprising:
   a recording device configured to generate video data;
   a projection screen having a front side facing the recording device and a rear side facing away from the recording device and
   a plurality of light sources, each light source of the plurality of light sources including at least a red light source, a green light source, and a blue light source;
   wherein the method comprises:
   providing background data which indicate a video background with a first resolution and determining image signals from the background data such that the image signals indicate the video background with a second resolution that is lower than the first resolution;
   transmitting the image signals to the plurality of light sources and irradiating the rear side of the projection screen by the plurality of light sources;
   recording first video data by the recording device, wherein the first video data indicate a video of the front side of the projection screen and of a foreground object which is arranged between the projection screen and the recording device;
   determining, by a data processing apparatus, second video data from the first video data by cropping a first image region of the video assigned to the foreground object from a second image region of the video assigned to the front side of the projection screen; and
   determining movement information which indicates a relative movement of the foreground object, and determining the first image region by the movement information.

2. The method according to claim 1, further comprising:
   determining depth information which indicates a distance between the recording device and the foreground object, and
   determining the first image region by the depth information.

3. The method according to claim 1, further comprising:
   determining, by the data processing apparatus, third video data from the second video data by combining the first image region with the video background.

4. The method according to claim 1, further comprising:
   arranging the plurality of light sources in a plane parallel to the projection screen.

5. The method according to claim 4, wherein arranging the plurality of light sources comprises:
   arranging the plurality of light sources equidistantly with respect to a first plane direction at a first distance and equidistantly with respect to a second plane direction at a second distance.

6. The method according to claim 4, wherein arranging the plurality of light sources comprises adjusting a third distance between the plane and the projection screen.

7. The method according to claim 1, further comprising:
   arranging the plurality of light sources in groups in a plurality of carriers, each of which has a horizontally aligned group of light sources.

8. The method according to claim 7, wherein arranging the plurality of light sources comprises:
   connecting the plurality of carriers using connecting means in such a way that each of the plurality of carriers is arranged equidistantly from one another.

9. The method according to claim 1, further comprising:
   providing the plurality of light sources with a red light-emitting diode, a green light-emitting diode, a blue light-emitting diode, a warm-white light-emitting diode and a cold-white light-emitting diode.

10. The method according to claim 1, wherein the image signals comprise a plurality of pixels, each of which is assigned to one of the light sources of the plurality of light sources.

11. The method according to claim 10, wherein determining the image signals comprises:
    assigning at least one of the pixels to a background position in the video background and determining the at least one pixel by weighted averaging of color information of the video background depending on the distance of the color information from the background position.

12. The method according to claim 10, wherein determining the image signals comprises:
    dividing the video background into a plurality of sub-regions, each of which is assigned to one of the pixels, and
    determining at least one of the pixels from color information from one of the sub-regions in each case.

13. A system for processing video data, comprising:
    a recording device which is configured to generate video data;
    a projection screen having a front side facing the recording device and a rear side facing away from the recording device and
    a plurality of light sources, each light source of the plurality of light sources including at least a red light source, a green light source, and a blue light source,
    wherein the system is configured to carry out a method, the method comprising:
    providing background data which indicate a video background with a first resolution and determining image signals from the background data such that the image signals indicate the video background with a second resolution that is lower than the first resolution;
    transmitting the image signals to the plurality of light sources and irradiating the rear side of the projection screen by the plurality of light sources;
    recording first video data by the recording device, wherein the first video data indicate a video of the front side of the projection screen and of a foreground object which is arranged between the projection screen and the recording device;
    determining, by a data processing apparatus, second video data from the first video data by cropping a first image region of the video assigned to the foreground object from a second image region of the video assigned to the front side of the projection screen; and
    determining movement information which indicates a relative movement of the foreground object, and determining the first image region by the movement information.

* * * * *